United States Patent [19]

Abe

[11] Patent Number: 4,700,236
[45] Date of Patent: Oct. 13, 1987

[54] IMAGE PROCESSING APPARATUS WITH IMPROVED GAMMA-CORRECTION

[75] Inventor: Shunichi Abe, Kawasaki, Japan

[73] Assignee: Canon Kabushiki Kaisha, Tokyo, Japan

[21] Appl. No.: 662,559

[22] Filed: Oct. 19, 1984

[30] Foreign Application Priority Data

Oct. 26, 1983 [JP] Japan ................... 58-199150

[51] Int. Cl.⁴ ................... H04N 1/40; H04N 1/10
[52] U.S. Cl. ................... 358/284; 358/280; 358/282; 358/293
[58] Field of Search ........... 358/280, 32, 164, 288, 358/293, 294, 284, 75, 80, 41, 282; 355/37, 35; 250/578

[56] References Cited

U.S. PATENT DOCUMENTS

| 3,018,331 | 1/1962 | McConnell | 358/282 |
| 4,288,821 | 9/1981 | Lalallee et al. | 358/293 |
| 4,402,015 | 8/1983 | Yamada | 358/280 |
| 4,495,522 | 1/1985 | Matsunawa et al. | 358/280 |

FOREIGN PATENT DOCUMENTS 0079373 5/1983 Japan ................... 358/75

Primary Examiner—Howard W. Britton
Assistant Examiner—John K. Peng
Attorney, Agent, or Firm—Fitzpatrick, Cella, Harper & Scinto

[57] ABSTRACT

An image processing apparatus comprises an illumination device for illuminating an original image, a photosensing device for converting the illuminated original image to an electrical signal and a conversion device for converting the output data of the photosensing device. The illumination device has a variable light intensity relative to the original image, and the conversion device changes a data conversion mode between a first mode and a second mode in accordance with the light illumination of the illumination device.

14 Claims, 4 Drawing Figures

IMAGE PROCESSING APPARATUS WITH IMPROVED GAMMA-CORRECTION

BACKGROUND OF THE INVENTION

1. Field of the Invention

The present invention relates to an image processing apparatus suitable for use with a digital copying machine.

2. Description of the Prior Art

In a digital color copying machine, a latent image of one color is formed on a photosensitive member in one original document exposure cycle. In this case, light is irradiated uniformly on a high density area and a low density area of the original document. As shown in FIG. 1, if a signal from a photosensor such as a CCD is reproduced before a $\gamma$-conversion (logarithmic conversion), the output signal from the CCD is non-linear relative to the original document density, that is, it lacks linearity. Accordingly, a reproduced image appears unnatural. In FIG. 1, the abscissa represents the original document density, and an ordinate represents the A/D converted value of the CCD output produced by irradiating the original document at an illumination of 20 luxes. $P_i$ represents an original document density versus A/D converted output curve before the $\gamma$-conversion, and $q_i$ represents that after the $\gamma$-conversion. In general, a dark area of the original document, that is, a shadow area has a gentle pre-conversion gradient, and a highlight area has a sharp pre-conversion gradient.

As a result, when the shadow area is $\gamma$-converted, a change in the A/D converted output before the $\gamma$-conversion for a given original document density change is one unit while a change after the $\gamma$-conversion is five units. Accordingly, fine tonality cannot be reproduced.

SUMMARY OF THE INVENTION

It is an object of the present invention to provide an improved image processing apparatus.

It is another object of the present invention to provide an image processing apparatus capable of reproducing a high quality of image.

It is other object of the present invention to provide an image processing apparatus capable of precisely reproducing an original image.

These are attained according to the present invention by means of an image processing apparatus which switches a light intensity of an illumination lamp and selects $\gamma$-converted data in accordance with the light intensity of the illumination lamp so that a tonality is attained even at high density areas and a high tonality is attained over a highlight area and a shadow area.

Other objects of the present invention will be apparent from the following description of the invention and the appended claims.

DETAILED DESCRIPTION OF THE PREFERRED EMBODIMENT

Figure 1:
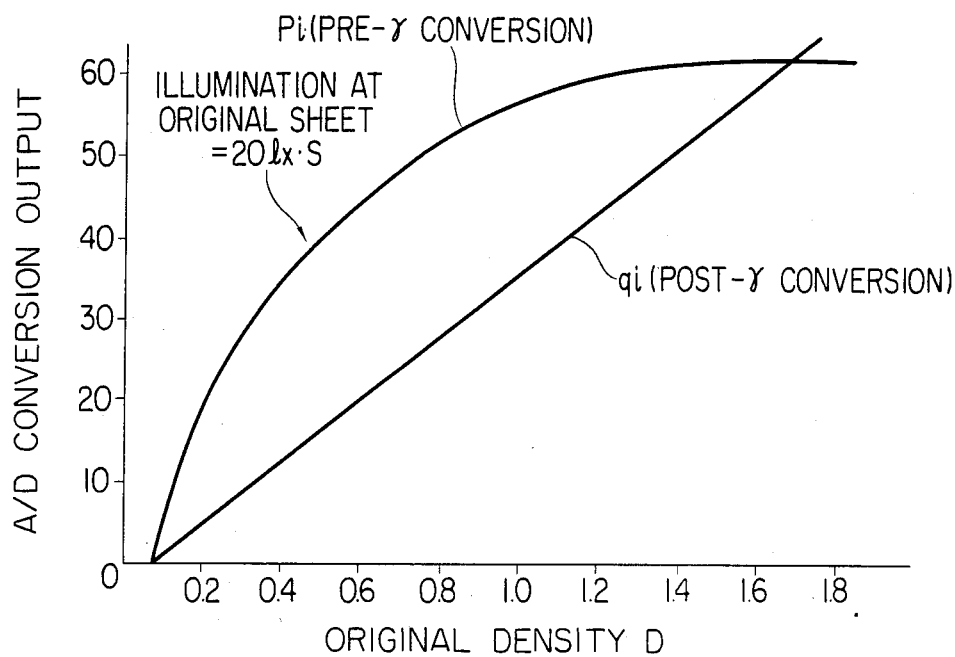
FIG. 1 shows an original document density versus A/D converted output of CCD curve and a similar curve after a $\gamma$-conversion when an original document is illuminated by the same light intensity.
Figure 4:
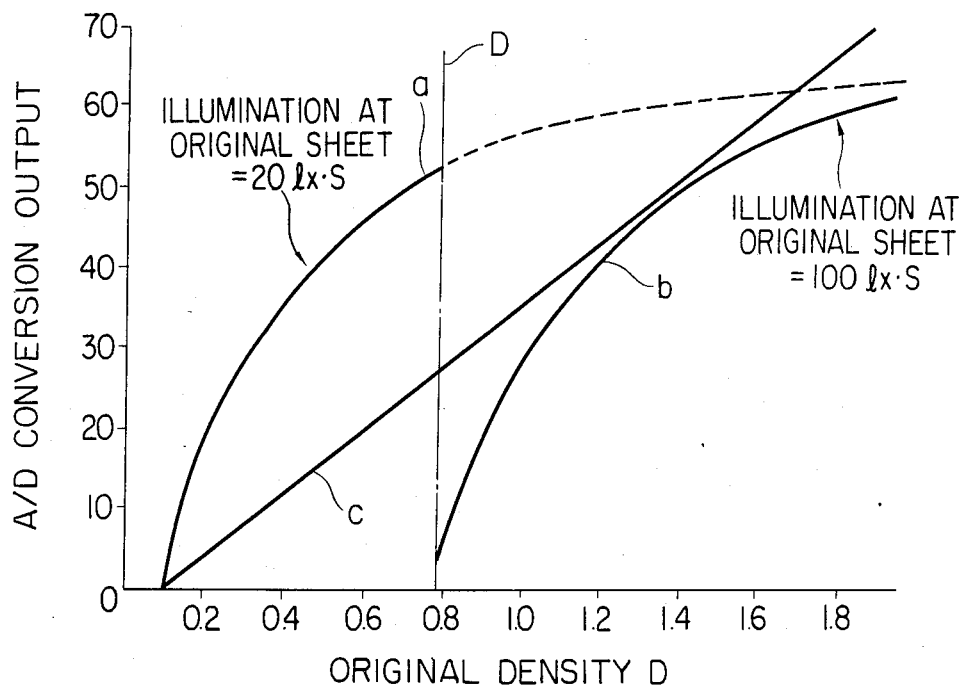
FIG. 4 shows an original document density versus A/D converted output of CCD curve and a similar curve after the $\gamma$-conversion in the present embodiment.

One embodiment of the present invention will now be explained with reference to FIGS. 2 to 4.

Figure 2:
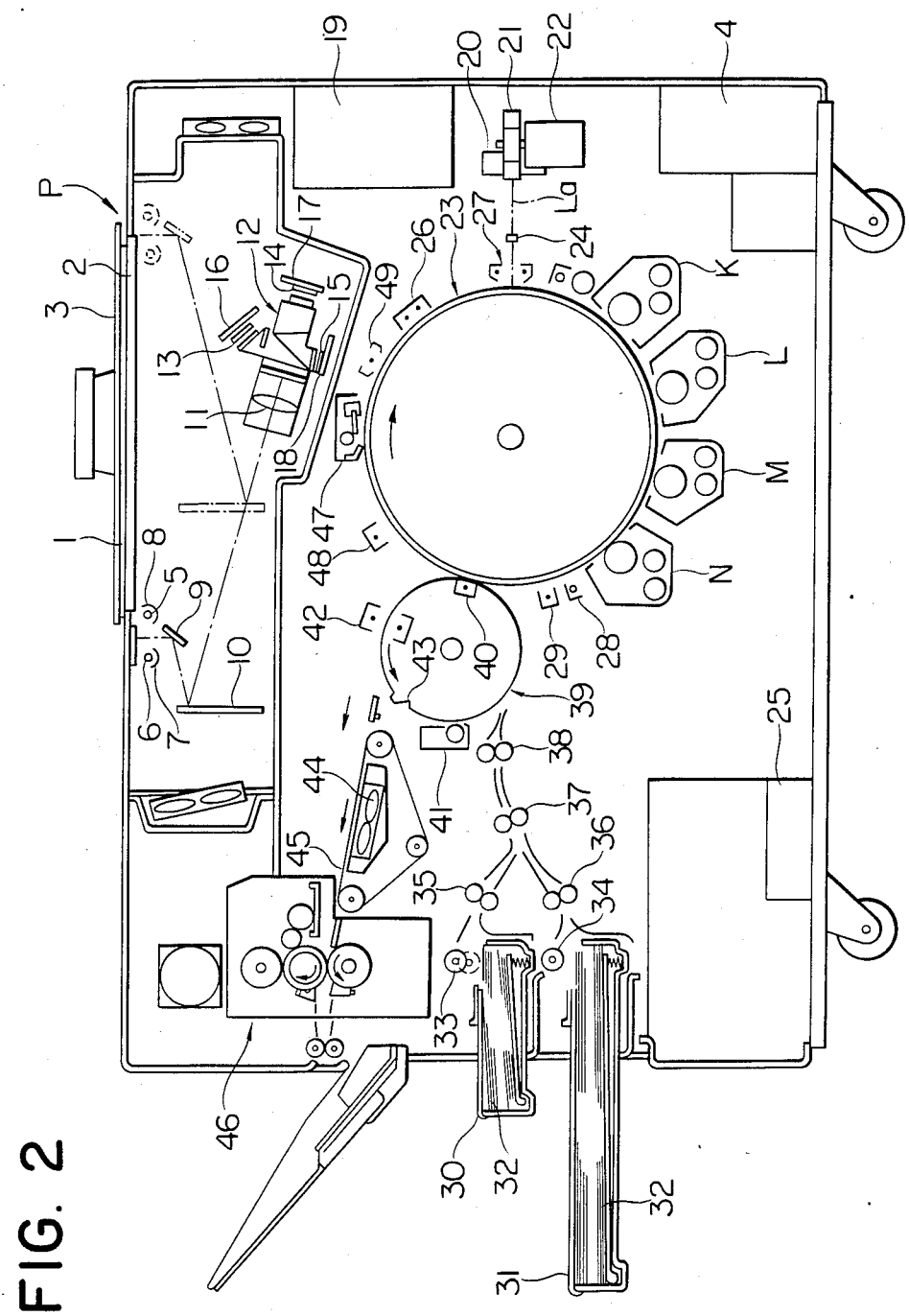
FIG. 2 is a sectional view of a color copying machine in accordance with one embodiment of the present invention.

FIG. 2 shows a sectional view of an apparatus of the present invention. Numeral 1 denotes an original document, numeral 2 denotes a transparent plate of an original document table P on which the original document 1 is mounted, numeral 3 denotes an original document mat for pressing the original document, numeral 4 denotes a main controller for controlling respective units, numerals 5 and 6 denote illumination lamps for illuminating the original document 1, numerals 7 and 8 denote reflection lamps arranged in vicinities of the illumination lamps 5 and 6, respectively, numerals 9 and 10 denote movable reflection mirrors moved at different velocities (V, $\frac{1}{2}$V) for reflecting lights from the illumination lamps 5 and 6, respectively, numeral 11 denotes a lens, numeral 12 denotes a dichroic mirror which decomposes the light transmitted through the lens 11 into blue, green and red lights, numeral 13 denotes a blue filter which passes the blue light of the decomposed lights, numeral 14 denotes a green filter which passes the green light, numeral 15 denotes a red filter which passes the red light, numerals 16, 17 and 18 denote solid-state imaging devices as photosensor means arranged for the filters 13, 14 and 15, respectively, numeral 19 denotes an image processing unit which processes outputs of the solid-state imaging devices 16, 17 and 18 by switching $\gamma$-conversion (logarithmic conversion) ROM A 52 and ROM B 53 to be described later, numeral 20 denotes a semiconductor laser, numeral 21 denotes a polygon mirror which reflects a laser beam La emitted by the semiconductor laser 20, numeral 22 denotes a scanner motor for rotating the polygon mirror 21, numeral 23 denotes a photosensitive drum, numeral 24 denotes a photosensor located 11 mm ahead of a start position of scan of the laser beam La on the photosensitive drum 23, numeral 25 denotes a high voltage supply for generating a high negative voltage, numeral 26 denotes a negative charger to which the negative high voltage is supplied from the high voltage supply 25, numeral 27 denotes an exposure unit, numeral 28 denotes a ghost elimination lamp, numeral 29 denotes a negative post electrode to which the voltage from the high voltage supply 25 is applied, numerals 30 and 31 denote upper and lower cassettes, numeral 32 denotes record papers accommodated in the upper and lower cassettes 30 and 31, numerals 33 and 34 denote paper feed rollers for feeding the record paper as they are rotated, numerals 35 and 36 denote upper and lower first registration rollers, numeral 37 denotes a roller for conveying the record paper 32, numeral 38 denotes a second registration roller, numeral 39 denotes a transfer drum on which the record paper 32 fed through the second registration roller 38 is wrapped, numeral 40 denotes a transfer electrode for transferring toner to the record paper 32, numeral 41 denotes a transfer drum cleaner for cleaning the transfer drum, numeral 42 denotes a discharge electrode to which the high voltage is applied from the high voltage source 25 for discharging the record paper, numeral 43 denotes a gripper, numeral 44 denotes a convey fan for conveying the record paper 32, numeral 45 denotes a convey belt for sucking and conveying the record paper 32, numeral 46 denotes a fixing unit, numeral 47 denotes a cleaner unit for removing the toner on the photosensitive drum 24, numeral 48 denotes a cleaner discharger, and numeral 49 denotes an AC pre-discharger for removing a potential on the photosensitive drum 24. K, L, M and N denote developing units for the respective colors for the respective decomposed lights.

Figure 3:
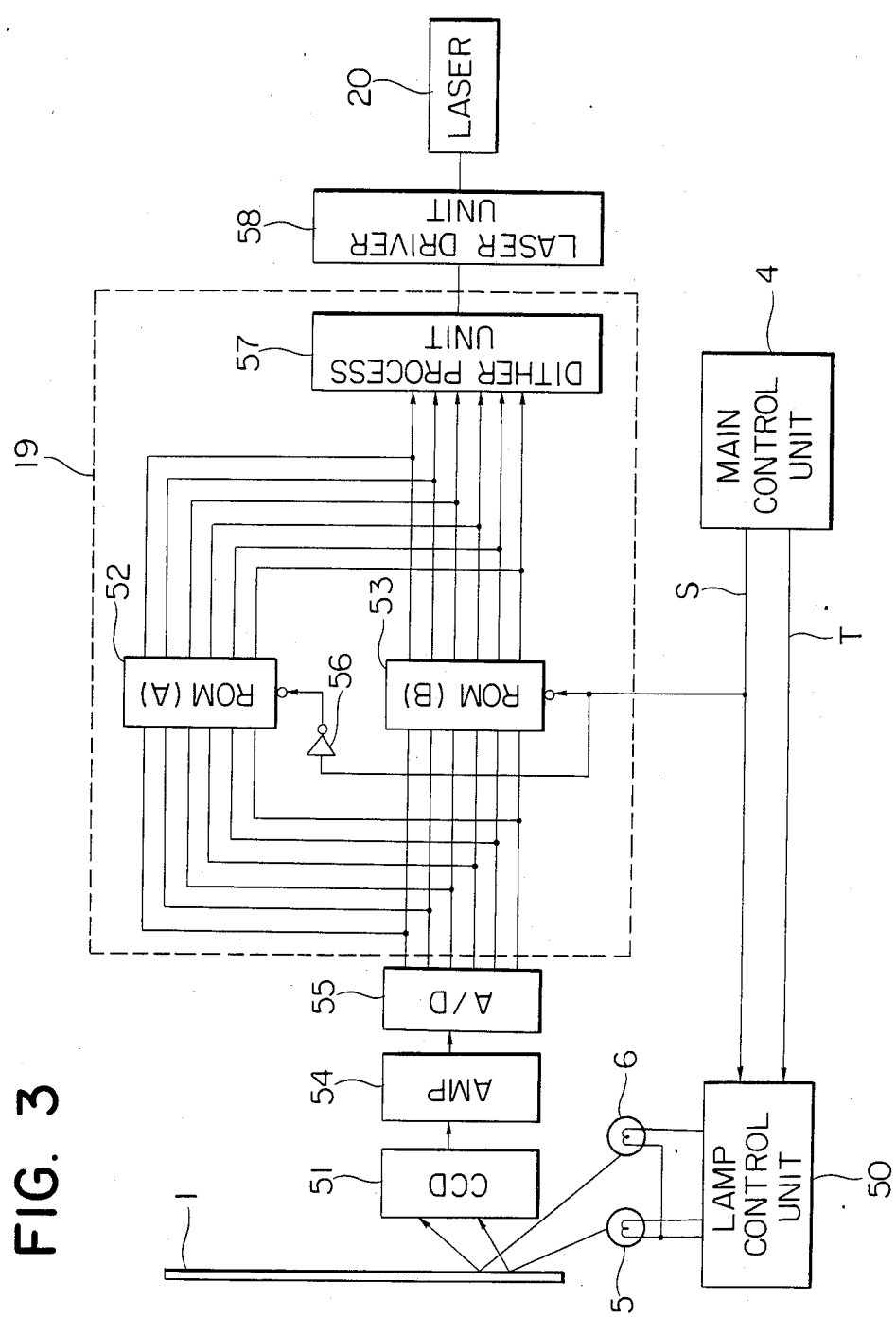
FIG. 3 is a signal processing block diagram in the present embodiment.

FIG. 3 shows a detail of the image processing unit 19. S denotes a lamp switching signal generated by the main control unit 4, T denotes an illumination lamp turn-on signal generated by the main control unit 4, numeral 50 denotes a lamp control unit as means for controlling light intensities of the illumination lamps 5 and 6, numeral 51 denotes a CCD photosensing unit for photoelectrically converting an original document image for reading, numeral 52 denotes a γ-correction ROM A, numeral 53 denotes a γ-correction ROM B, numeral 54 denotes an amplifier for amplifying a signal from the CCD photosensing unit 51, numeral 55 denotes an A/D converter, numeral 56 denotes an inverter, numeral 57 denotes a dither processing circuit for dither-processing the image data from the ROM A or ROM B for binarization, and numeral 58 denotes a laser driver unit for driving the semiconductor laser 20.

A copying operation of the copying machine shown in FIG. 2 is now explained.

The original document 1 is mounted on the transparent plate 2 of the original document table P and the original document 1 is pressed by the original document mat 3.

The main control unit 4 controls a copy sequence other than the image signal processing.

The copy sequence in the present embodiment may be a known process and the details thereof are not explained here.

In FIG. 3, when the lamp switching signal S from the main control unit 4 is low and the illumination lamp turn-on signal T is produced, only the illumination lamp 5 is lit by the lamp control unit 50. The ROM B 53 is selected for the γ-correction.

The light from the illumination lamp 5 is merged with the lights from the reflection mirrors 7 and 8 and the light is irradiated onto the original document, and light reflected thereby is directed to the movable reflection mirrors 9 and 10. As the reflected light impinges on the dichroic mirror 12 through the lens 11, it is decomposed into blue light, green light and red light. The decomposed light beams pass through the filters 13, 14 and 15 corresponding to the green, blue and red, respectively, and are sensed by the solid-state imaging devices 16, 17 and 18. The image of the original document 1 is focused on the solid-state imaging devices 16, 17 and 18 of the respective colors through the lens 11 and the dichroic mirror 12 while the optical path length thereof is kept constant by the movable reflection mirror 8 moved with the illumination lamps 5 and 6 and the movable reflection mirror 9 which is moved is the same direction at one half of the velocity of the movable reflection mirror 8.

The outputs of the solid-state imaging devices 16, 17 and 18 are image-processed by the image processing unit 19, and the semiconductor laser 20 is driven by the laser driver unit 58 to emit the laser beam La. The laser beam La is reflected by the polygon mirror 21 rotated by the scanner motor 21 and directed to the photosensitive drum 23 for light scan.

When the laser beam La thus scanned strikes the photosensor 24, a beam detection signal BD is generated by the photosensor to synchronize for each scan.

The photosensitive drum 23 in charged more negatively than the negative charger 26 to which the negative high voltage is applied from the high voltage supply 25. When the laser beam La reaches the exposure unit 27 of the photosensitive drum 23, an electrostatic latent image is formed on the photosensitive drum in accordance with on and off states of the laser beam La.

In FIG. 3, the image processing unit 19, the CCD photosensing unit 51, the amplifier 54 and the A/D converter 55 are shown for only one color of processing although one set is provided for each of the three colors.

Thus, the CCD photosensing unit shown in FIG. 3 corresponds to one of the solid-state imaging devices 16, 17 and 18 shown in FIG. 2.

A two-lamp turn-on operation is now explained. When the lamp switching signal S generated by the main control unit 4 is high and the illumination lamp turn-on signal T is produced, both the illumination lamps 5 and 6 are lit by the lamp control unit 50. The lamp control unit 50 may be a simple switch.

When the illumination lamps 5 and 6 are simultaneously lit, the illumination is approximately five times as large as that obtained when only the illumination lamp 5 is lit.

The γ-correction ROM A 52 is selected.

An electrostatic latent image is formed on the photosensitive drum 23.

When only the illumination lamp 5 is lit, the γ-correction ROM B 53 is selected as described above. When the ROM A 52 is selected, the γ-correction is mode in accordance with the content of the ROM A 52 shown in Table 2. The content of the ROM B 53 is shown in Table 1.

TABLE 1

| Address | Data | Address | Data |
|---------|------|---------|------|
| 0 | 0 | 32 | 10 |
| 1 | 0 | 33 | 10 |
| 2 | 0 | 34 | 11 |
| 3 | 1 | 35 | 11 |
| 4 | 1 | 36 | 12 |
| 5 | 1 | 37 | 12 |
| 6 | 1 | 38 | 13 |
| 7 | 1 | 39 | 13 |
| 8 | 1 | 40 | 14 |
| 9 | 2 | 41 | 15 |
| 10 | 2 | 42 | 16 |
| 11 | 2 | 43 | 16 |
| 12 | 2 | 44 | 17 |
| 13 | 2 | 45 | 18 |
| 14 | 3 | 46 | 19 |
| 15 | 3 | 47 | 20 |
| 16 | 3 | 48 | 21 |
| 17 | 3 | 49 | 22 |
| 18 | 3 | 50 | 23 |
| 19 | 4 | 51 | 24 |
| 20 | 4 | 52 | 25 |
| 21 | 5 | 53 | 26 |
| 22 | 5 | 54 | 28 |
| 23 | 5 | 55 | 0 |
| 24 | 6 | 56 | 0 |
| 25 | 6 | 57 | 0 |
| 26 | 7 | 58 | 0 |
| 27 | 7 | 59 | 0 |
| 28 | 8 | 60 | 0 |
| 29 | 8 | 61 | 0 |
| 30 | 9 | 62 | 0 |
| 31 | 9 | 63 | 0 |

TABLE 2

| Address | Data | Address | Data |
| --- | --- | --- | --- |
| 0 | 0 | 32 | 38 |
| 1 | 0 | 33 | 38 |
| 2 | 0 | 34 | 39 |
| 3 | 0 | 35 | 39 |
| 4 | 0 | 36 | 40 |
| 5 | 0 | 37 | 41 |
| 6 | 28 | 38 | 41 |
| 7 | 28 | 39 | 41 |
| 8 | 28 | 40 | 42 |
| 9 | 28 | 41 | 43 |
| 10 | 29 | 42 | 44 |
| 11 | 29 | 43 | 44 |
| 12 | 29 | 44 | 45 |
| 13 | 30 | 45 | 46 |
| 14 | 30 | 46 | 47 |
| 15 | 30 | 47 | 48 |
| 16 | 31 | 48 | 49 |
| 17 | 31 | 49 | 50 |
| 18 | 31 | 50 | 51 |
| 19 | 32 | 51 | 52 |
| 20 | 32 | 52 | 53 |
| 21 | 32 | 53 | 55 |
| 22 | 33 | 54 | 56 |
| 23 | 33 | 55 | 58 |
| 24 | 34 | 56 | 59 |
| 25 | 34 | 57 | 61 |
| 26 | 35 | 58 | 63 |
| 27 | 35 | 59 | 63 |
| 28 | 36 | 60 | 63 |
| 29 | 36 | 61 | 63 |
| 30 | 37 | 62 | 63 |
| 31 | 37 | 63 | 63 |

In the present embodiment, the A/D converted output (6 bits) of the CCD is directly supplied to the ROM A 52 or the ROM B 53 as an address. Accordingly, the γ-converted value corresponding to the CCD output is produced in real time from the ROM A 52 or ROM B 53.

In the present embodiment, two scans are carried out for each color and the developing unit for each color is selected. The selected developing unit develops the image by a magnetic blade system powder developing method so that the electrostatic latent image on the photosensitive drum 23 is visualized.

Then, the electrostatic latent image on the charged drum is removed by the ghost removing lamp 28 and the post electrode 29. The upper or lower cassette 30 or 31 is selected by the console panel, the paper feed rollers 33 and 34 rotate, and the record paper 32 passes between the upper and lower first registration rollers 35 and 36 and is wrapped around the transfer drum 39 by the gripper 43. The toner of the image formed on the photosensitive drum 23 is transferred to the record paper by the transfer electrode 40. In the present embodiment, the transfer is carried out as many times as the member of colors selected.

The turn-on conditions of the illumination lamps 5 and 6 and the γ-correction have the following relationship.

The first scan for the original document is carried out with only the illumination lamp 5 lit and only a solid line portion of the curve a (FIG. 4) of the A/D converted output signal is γ-converted by the γ-conversion ROM B. Then, both the illumination lamps 5 and 6 are lit and the second scan for the original document is carried out, and only a solid line portion of the curve b (FIG. 4) is γ-corrected by the γ-correction ROM A containing the correction values as shown in Table 2. In FIG. 4, the abscissa represents an original document density and the ordinate represents an A/D converted output of the CCD. The portion a on the left of chain line D is an original document density versus A/D converted output curve when the original document is illuminated at an illumination of 20 luxes, the portion b on the right is an original document density versus A/D converted output curve when the original document is illuminated at an illumination of 100 luxes, and a curve c is an original document density versus A/D converted output curve after the γ-conversion.

First, only one lamp is lit and the output is γ-corrected with the correction values stored at the addresses excluding an area d shown in the Table 1 to form the latent image on the photosensitive drum, and then the two lamps are lit and the output is γ-corrected with the correction values stored at the addresses in areas e and f in the Table 2 and the latent image is superimposed on the photosensitive drum. Then, the images are developed. In this manner, fine tonality is attained even in the areas e and f shown in Table 2.

In the present embodiment, the number of lamps lit is changed to control the light intensity illuminated to the original document 1. Alternatively, the lamp voltage may be changed to control the light intensity. The illumination position of the lamp may be changed to control the light intensity. An ND filter may be inserted between the original document 1 and the CCD photosensing unit 51 to control the light intensity.

In the present embodiment, the γ-correction is carried out by switching the enable terminals of the ROMA A 52 and ROM B 53. Alternatively, different γ-characteristics may be stored at different addresses in one ROM and the addresses may be selected to select one of the γ-characteristics.

In the present embodiment, the electrostatic latent image is formed in the first exposure cycle and another latent image is superimposed in the second exposure cycle and the image is developed. Alternatively, the development and the transfer may be carried out for each exposure cycle so that three-color image may be developed by two cycles for each color, or six transfer cycles in total.

The present invention is not limited to the above embodiments but many modifications may be made within the scope of the appended claims.

What I claimed is:

1. An image processing apparatus comprising:
   illumination means for illuminating an original image, said illumination means being capable of selecting a light intensity for irradiating the original image;
   photosensing means for reading the original image illuminated by said illuminations means to produce an electric data signal; and
   conversion means for converting characteristics of the data signal from said photosensing means into different characteristics, said conversion means having a plurality of modes for data conversion, said modes being changed over in accordance with the selected light intensity with which the original image is irradiated.

2. An image processing apparatus according to claim 1 wherein said conversion means is γ-conversion means for γ-converting the output data of said photosensing means.

3. An image processing apparatus according to claim 1 wherein said illumination means includes a plurality of lamp means.

4. An image processing apparatus according to claim 1 wherein said photosensing means includes a solid-state imaging device for photoelectrically converting a light reflected from the original image.

5. An image processing apparatus according to claim 1 further comprising means for dither-processing the output of said conversion means.

6. An apparatus according to claim 1, wherein said conversion means has a first table storing therein data for conversion in said first mode and a second table storing therein data for conversion in said second mode.

7. An apparatus according to claim 1, further comprising means for forming an image by utilizing the image signals converted in said first and second modes.

8. An image processing apparatus comprising:
means for producing an image signal representing an original image, said producing means having first and second production modes for producing first and second signals in first and second density ranges, respectively, a timing of image production in said first mode being different from a timing of image production in said second mode;
means for converting characteristics of the image signal into different characteristics, said converting means having first and second conversion modes which are changed over in accordance with said first or second production mode, respectively; and
means for forming an image by utilizing both a first image signal from said producing means converted in said first conversion mode and a second image signal from said producing means converted in said second conversion mode.

9. An image processing apparatus according to claim 8 wherein said output means includes illumination means for illuminating the original image and photosensing means for converting the original image illuminated by said illumination means to the image signal.

10. An image processing apparatus according to claim 9 wherein said output means selects the output mode of said image signal by selecting the light intensity of said illumination means.

11. An image processing apparatus according to claim 8 wherein said conversion means is $\gamma$-conversion means for $\gamma$-converting said image signal.

12. An image processing apparatus according to claim 11 wherein said $\gamma$-conversion means includes memory means for storing $\gamma$-conversion data corresponding to the image signal, said memory means being switched between a first memory area and a second memory area in accordance with the output mode.

13. An image processing apparatus comprising:
means for illuminating an original image, said illuminating means being capable of selecting a first or a second light intensity;
means for controlling said illuminating means so that said first light intensity is selected relating to a first density area of the original and said second light intensity is selected relating to a second density area of the original; and
means for converting an original image illuminated by said illumination means into an image signal.

14. An apparatus according to claim 13, wherein said first density area is low in image density and said second density area is high in image density, and wherein said first light intensity is lower than said second light intensity.

* * * * *

UNITED STATES PATENT AND TRADEMARK OFFICE
CERTIFICATE OF CORRECTION

PATENT NO. : 4,700,236
DATED : October 13, 1987
INVENTOR(S) : SHUNICHI ABE

It is certified that error appears in the above-identified patent and that said Letters Patent is hereby corrected as shown below:

AT [56] IN REFERENCES CITED

"4,288,821  9/1981  Lalallee et al. . . . . . 358/293" should read --4,288,821  9/1981  Lavallee et al. . . . . . 358/293--.

COLUMN 1

Line 22, "an ordinate represents the" should read --the ordinate represents an--.
Line 43, "other" should read --another--.

COLUMN 3

Line 3, "24," should read --23,--.
Line 6, "24." should read --23.--.
Line 59, "is" (second occurrence) should read --in--.

COLUMN 4

Line 34, "mode" should read --made--.

COLUMN 5

Line 54, "member" should read --number--.

UNITED STATES PATENT AND TRADEMARK OFFICE
CERTIFICATE OF CORRECTION

PATENT NO. : 4,700,236
DATED : October 13, 1987
INVENTOR(S) : SHUNICHI ABE

It is certified that error appears in the above-identified patent and that said Letters Patent is hereby corrected as shown below:

<u>COLUMN 6</u>

Line 7, delete "a".
    Line 30, "ROMA A 52" should read --ROM A 52--.
    Line 45, "What I claimed is:" should read --"What I claim is:--.
    Line 51, "illuminations" should read --illumination--.

Signed and Sealed this

Fifteenth Day of March, 1988

Attest:

DONALD J. QUIGG

*Attesting Officer*    *Commissioner of Patents and Trademarks*